US010316822B2

(12) United States Patent
Hoffmann et al.

(10) Patent No.: US 10,316,822 B2
(45) Date of Patent: Jun. 11, 2019

(54) SYSTEM AND METHOD FOR IMPROVED OVERSPEED MONITORING OF A WIND TURBINE OPERATING AT REDUCED ROTOR SPEEDS

(71) Applicant: General Electric Company, Schenectady, NY (US)

(72) Inventors: Till Hoffmann, Osnabrueck (DE); Hartmut Scholte-Wassink, Lage (DE); Andreas Joergens, Lingen (DE); Thomas Joseph Fischetti, Simpsonville, SC (US)

(73) Assignee: General Electric Company, Schenectady, NY (US)

( * ) Notice: Subject to any disclaimer, the term of this patent is extended or adjusted under 35 U.S.C. 154(b) by 389 days.

(21) Appl. No.: 15/339,996

(22) Filed: Nov. 1, 2016

(65) Prior Publication Data

US 2018/0119671 A1 May 3, 2018

(51) Int. Cl.
*F03D 7/02* (2006.01)
*F03D 17/00* (2016.01)

(52) U.S. Cl.
CPC ......... *F03D 7/0264* (2013.01); *F03D 7/0244* (2013.01); *F03D 17/00* (2016.05); *F05B 2270/1011* (2013.01); *Y02E 10/723* (2013.01)

(58) Field of Classification Search
CPC ...... F03D 7/0244; F03D 7/0264; F03D 17/00; F05B 2270/1011; Y02E 10/723
See application file for complete search history.

(56) References Cited

U.S. PATENT DOCUMENTS

2004/0145188 A1* 7/2004 Janssen ............... F03D 7/0224
290/44
2010/0133817 A1* 6/2010 Kinzie ................. F03D 7/0224
290/44
2010/0133821 A1* 6/2010 Scholte-Wassink ........................
F03D 7/0224
290/44

(Continued)

FOREIGN PATENT DOCUMENTS

JP      2013/233045      11/2013
WO   WO 2013/010332    1/2013
WO   WO 2016/184470    11/2016

OTHER PUBLICATIONS

International Search Report and Written Opinion International Application No. PCT/US2018/030069 dated Jan. 25, 2019 (9 pages).

*Primary Examiner* — Igor Kershteyn
(74) *Attorney, Agent, or Firm* — Dority & Manning, P.A.

(57) ABSTRACT

A method for overspeed monitoring of a wind turbine may generally include monitoring an actual rotor speed of the wind turbine while the wind turbine is operating at a current speed setpoint and referencing a dynamic overspeed setting for the wind turbine. The method may also include determining a final overspeed setting to be applied for the wind turbine based on a comparison between the dynamic overspeed setting and a predetermined overspeed setting for the wind turbine. In addition, the method may include comparing the actual rotor speed of the wind turbine to the final overspeed setting, and when the actual rotor speed is equal to or exceeds the final overspeed setting, initiating a control action to adjust an operation of the wind turbine in a manner that reduces the actual rotor speed.

20 Claims, 5 Drawing Sheets

(56) References Cited

U.S. PATENT DOCUMENTS

| | | |
|---|---|---|
| 2010/0140939 A1* | 6/2010 | Scholte-Wassink ........................ F03D 7/0224 290/44 |
| 2011/0135470 A1 | 6/2011 | Merkel |
| 2011/0142620 A1 | 6/2011 | Loh et al. |
| 2012/0061961 A1* | 3/2012 | Yasugi .................. F03D 7/0284 290/44 |
| 2014/0050579 A1 | 2/2014 | Perley et al. |

* cited by examiner

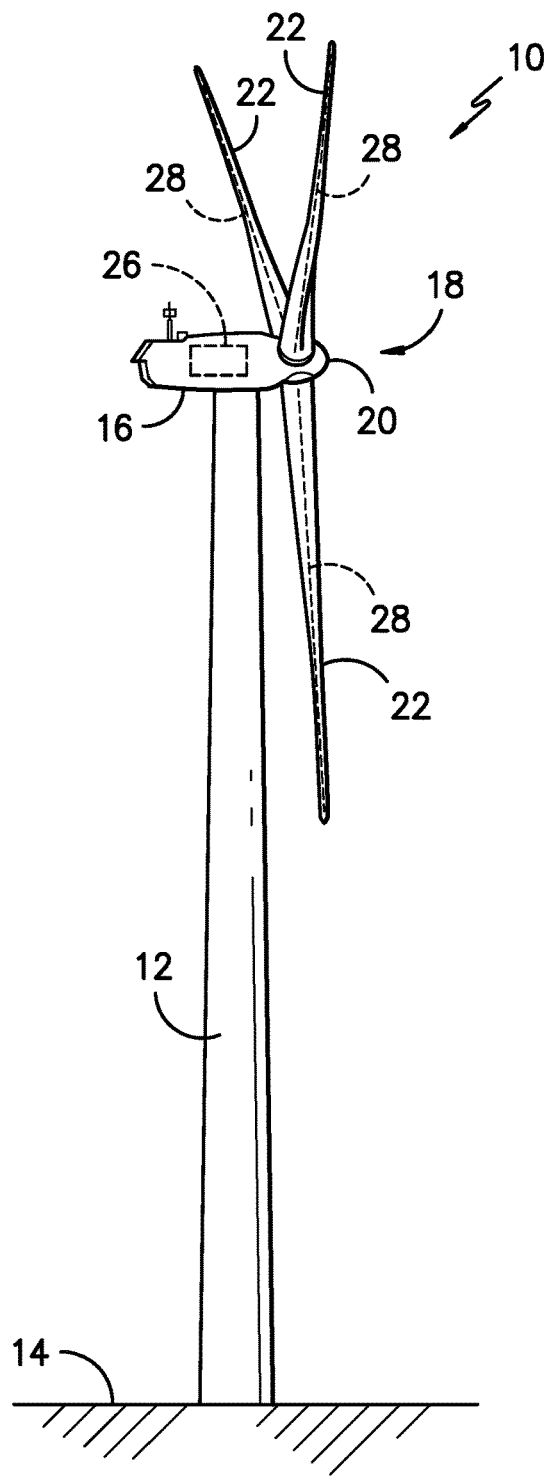
FIG. -1-

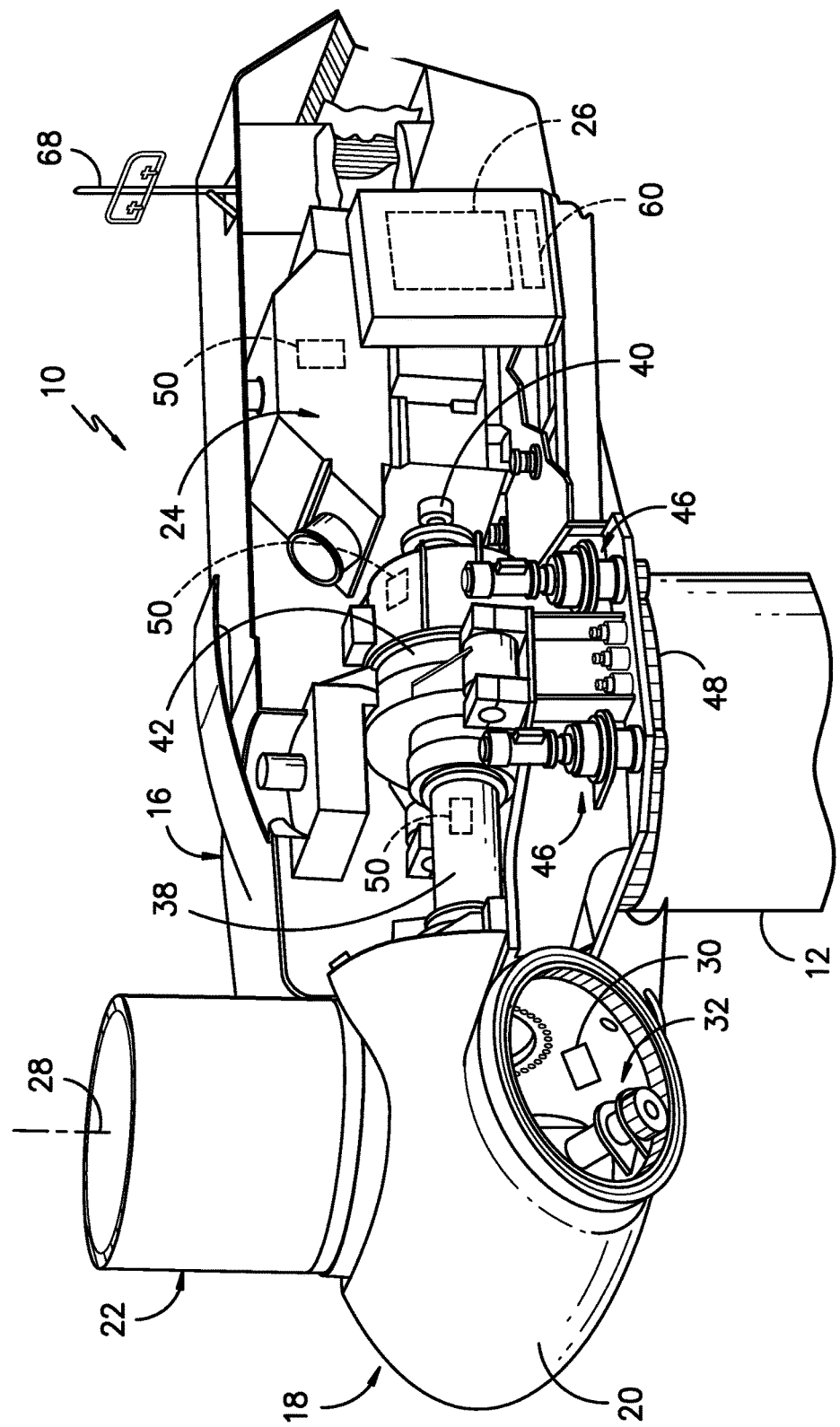
FIG. -2-

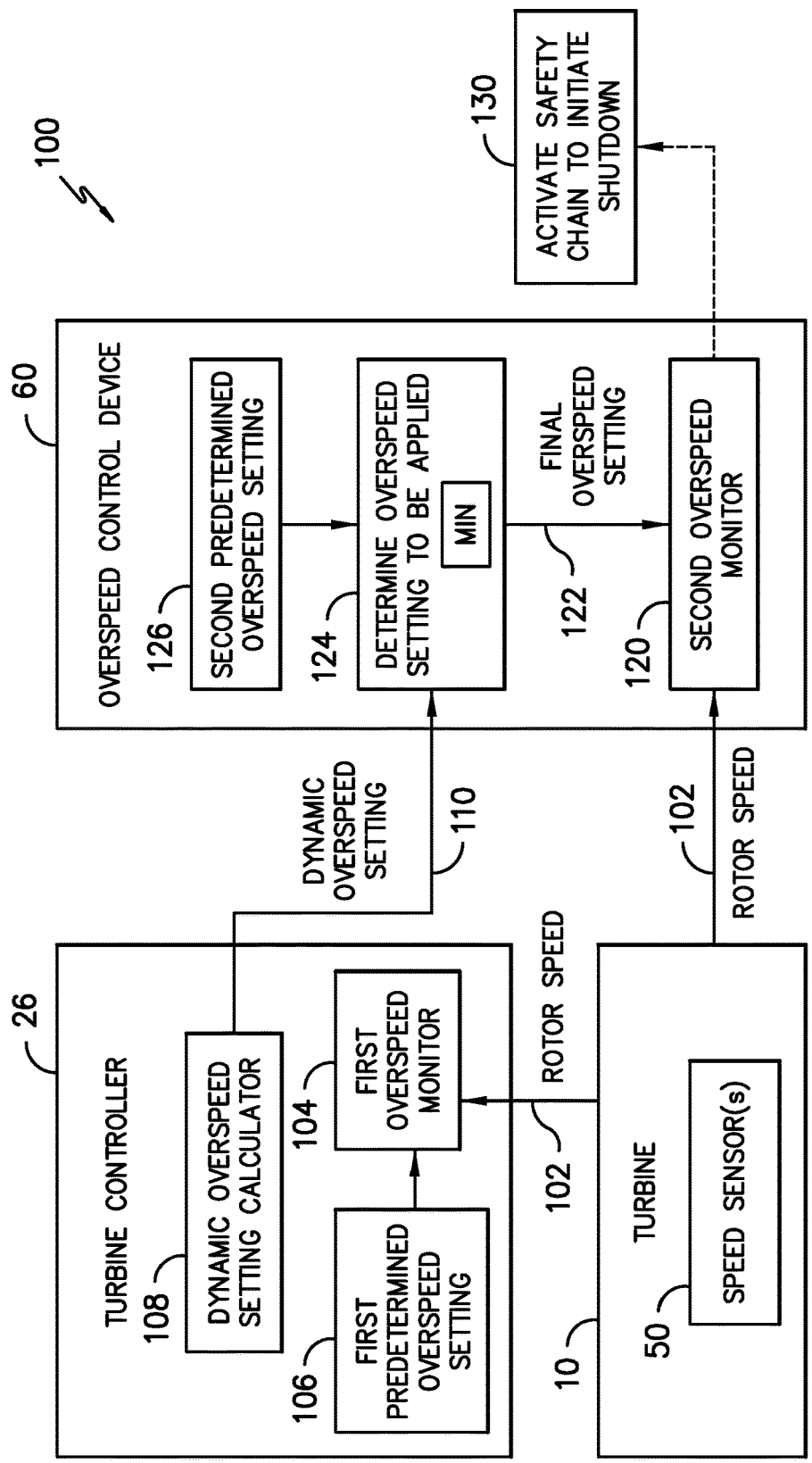
FIG. -3-

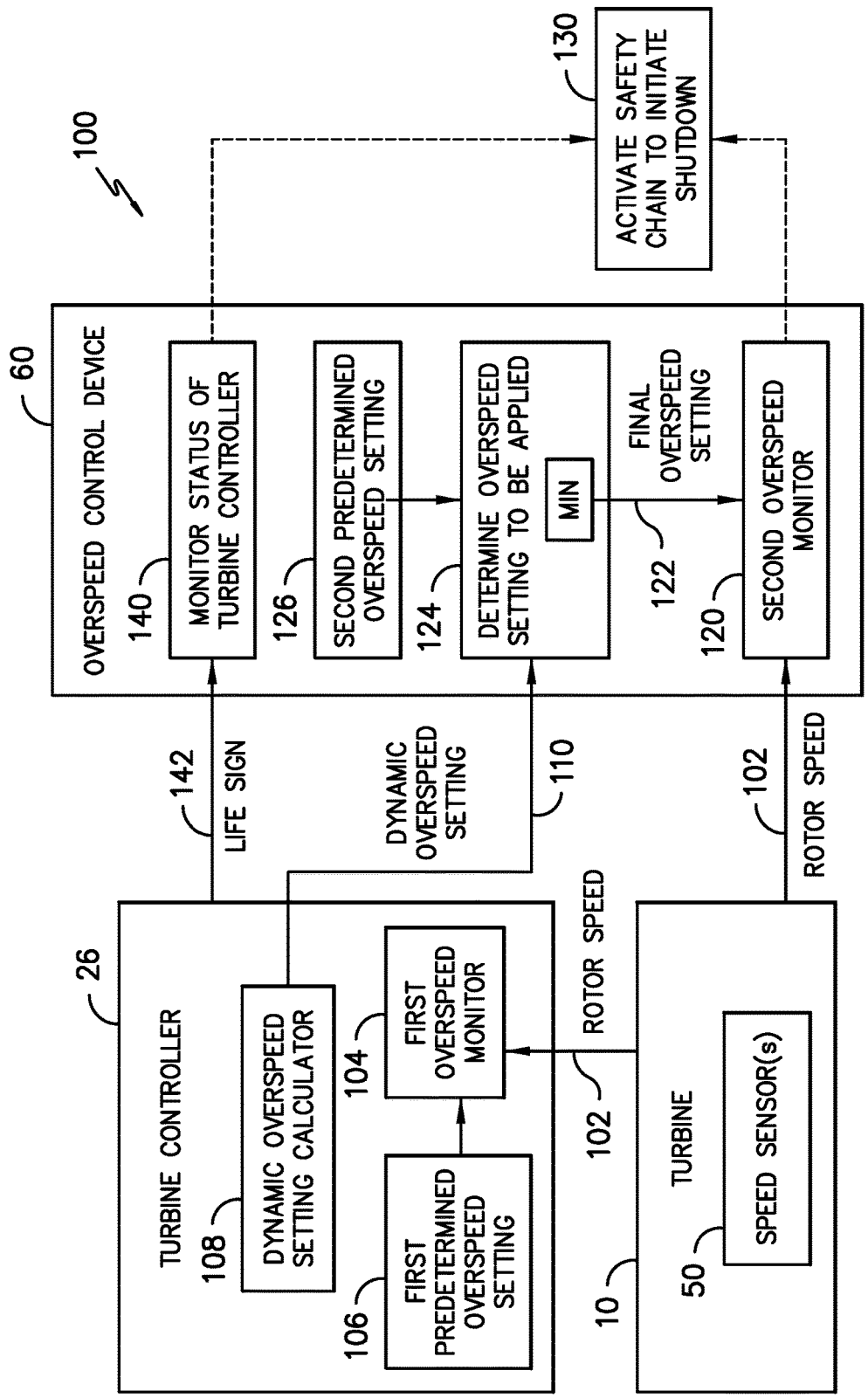
FIG. -4-

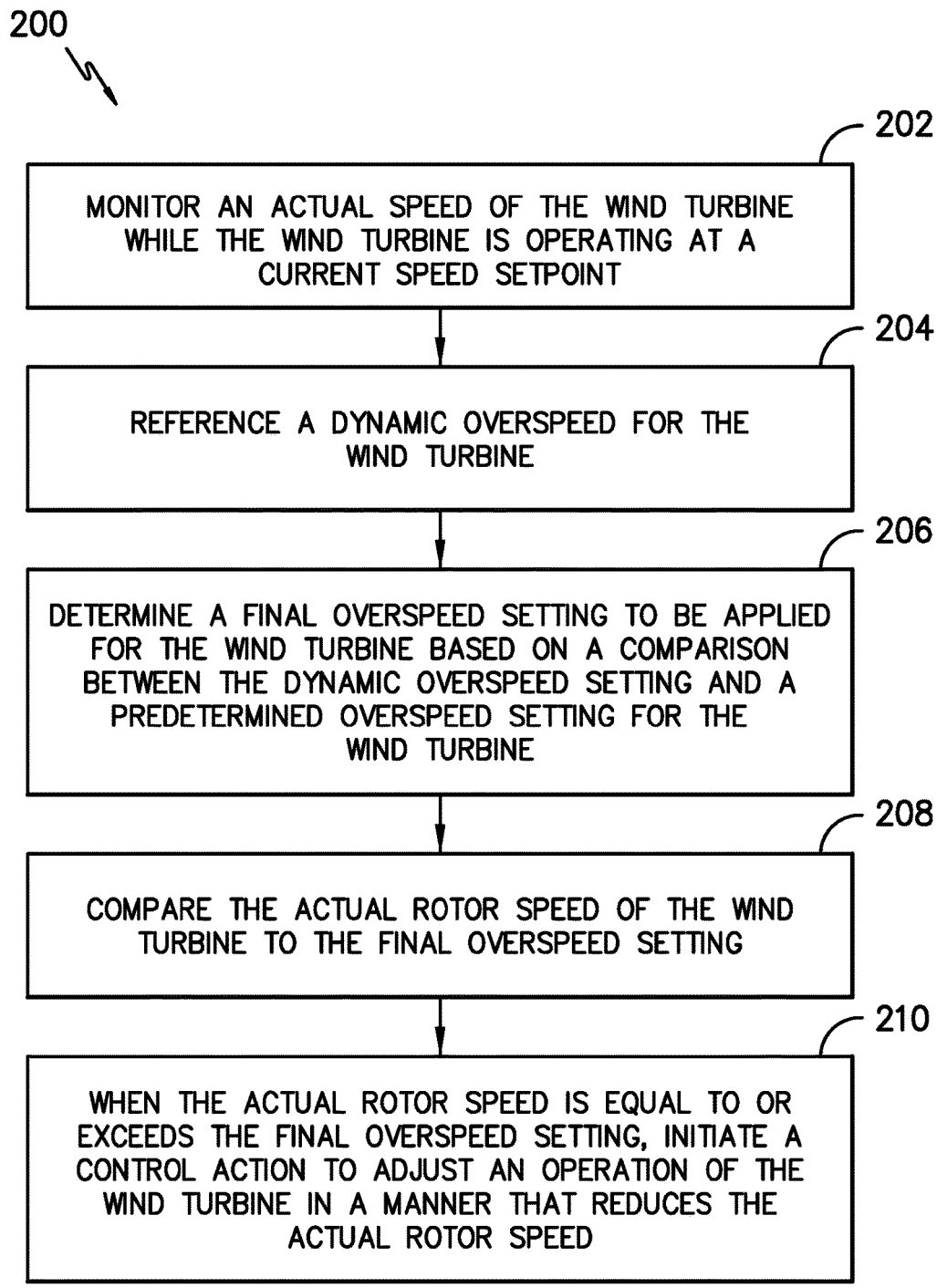
FIG. -5-

SYSTEM AND METHOD FOR IMPROVED OVERSPEED MONITORING OF A WIND TURBINE OPERATING AT REDUCED ROTOR SPEEDS

FIELD OF THE INVENTION

The present subject matter relates generally to wind turbines and, more particularly, to a system and method for overspeed monitoring of a wind turbine operating at reduced rotor speeds (e.g., at a speed setpoint below its nominal speed).

BACKGROUND OF THE INVENTION

Wind power is considered one of the cleanest, most environmentally friendly energy sources presently available, and wind turbines have gained increased attention in this regard. A modern wind turbine typically includes a tower, a nacelle rotatably supported on the tower, a generator housed in the nacelle, and one or more rotor blades. The rotor blades capture kinetic energy from wind using known airfoil principles, and transmit the kinetic energy through rotational energy to turn a shaft that couples the rotor blades to a gearbox, or if a gearbox is not used, directly to the generator. The generator then converts the mechanical energy to electrical energy that may be deployed to a utility grid. With the growing interest in wind generated electricity, considerable efforts have been made to develop wind turbines that are reliable and efficient.

Current wind turbines typically include an overspeed monitoring system that monitors the rotor speed relative to a fixed overspeed setting(s) (i.e., a fixed maximum rotor speed setting(s) for the wind turbine). In general, the fixed overspeed setting(s) is determined as a function of the predetermined, nominal speed for the wind turbine. For example, the fixed overspeed setting(s) may be set as a maximum speed setting that is greater than the wind turbine's nominal speed. In such instance, if the rotor speed for the wind turbine exceeds the fixed overspeed setting(s), a control action may be implemented by the overspeed monitoring system to reduce the rotor speed and/or to shutdown the wind turbine.

In many instances, it is desired to operate a wind turbine at reduced speeds (e.g., at a speed setting below the turbine's nominal speed). For example, a wind turbine may often be operated at a derated speed to compensate for the higher loads caused by higher air densities. Unfortunately, given the configuration of conventional overspeed monitoring systems, the fixed overspeed setting(s) applied by a current monitoring system is the same regardless of whether the speed setpoint for the wind turbine is set at the nominal speed or a reduced speed. Thus, if a failure of the turbine controller occurs while the wind turbine is operating at reduced speeds, the turbine rotor is allowed to accelerate across a large range of speed values from the reduced rotor speed to the fixed overspeed setting(s) prior to any control action being implemented by the overspeed monitoring system. Such significant acceleration of the rotor often results in the load capabilities of one or more of the wind turbine components being exceeded, thereby leading to damage and/or failure of such component(s).

Accordingly, a system and method for improved overspeed monitoring of a wind turbine operating at reduced rotor speeds (e.g., at a speed setpoint below its nominal speed) would be welcomed in the technology.

BRIEF DESCRIPTION OF THE INVENTION

Aspects and advantages of the invention will be set forth in part in the following description, or may be obvious from the description, or may be learned through practice of the invention.

In one aspect, the present subject matter is directed to a method for overspeed monitoring of a wind turbine. The method may generally include monitoring, with a control device, an actual rotor speed of the wind turbine while the wind turbine is operating at a current speed setpoint and referencing, with the control device, a dynamic overspeed setting for the wind turbine. The method may also include determining, with the control device, a final overspeed setting to be applied for the wind turbine based on a comparison between the dynamic overspeed setting and a predetermined overspeed setting for the wind turbine, comparing, with the control device, the actual rotor speed of the wind turbine to the final overspeed setting, and when the actual rotor speed is equal to or exceeds the final overspeed setting, initiating, with the control device, a control action to adjust an operation of the wind turbine in a manner that reduces the actual rotor speed.

In another aspect, the present subject matter is directed to an overspeed monitoring system for a wind turbine. The system may include a turbine controller configured to control one or more components of the wind turbine so that the wind turbine operates at a current speed setpoint. The turbine controller may also be configured to determine a dynamic overspeed setting for the wind turbine. The system may also include an overspeed control device communicatively coupled to the turbine controller. The overspeed control device may be configured to receive the dynamic overspeed setting from the turbine controller and determine a final overspeed setting to be applied for the wind turbine based on a comparison between the dynamic overspeed setting and a predetermined overspeed setting for the wind turbine. The overspeed control device may also be configured to monitor an actual rotor speed of the wind turbine and compare the actual rotor speed to the final overspeed setting. In addition, when the actual rotor speed is equal to or exceeds the final overspeed setting, the control device may be configured to initiate a control action to adjust the operation of the wind turbine in a manner that reduces the actual rotor speed.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which:

FIG. 1 illustrates a perspective view of one embodiment of a wind turbine in accordance with aspects of the present subject matter;

FIG. 2 illustrates a simplified, internal view of one embodiment of the nacelle of the wind turbine shown in FIG. 1 in accordance with aspects of the present subject matter;

FIG. 3 illustrates a schematic view of one embodiment of an overspeed monitoring system in accordance with aspects of the present subject matter;

FIG. 4 illustrates a schematic view of another embodiment of the overspeed monitoring system shown in FIG. 3; and FIG. 5 illustrates a flow diagram of one embodiment of a method for overspeed monitoring of a wind turbine in accordance with aspects of the present subject matter.

DETAILED DESCRIPTION OF THE INVENTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

In general, the present subject matter is directed to a system and method for overspeed monitoring of a wind turbine. In particular, the disclosed system and method provided from improved overspeed monitoring when a wind turbine is operating at reduced or derated rotor speeds (i.e., at a speed setpoint below the nominal speed for the wind turbine). As will be described below, in several embodiments, a turbine controller of the wind turbine may be configured to calculate a dynamic overspeed setting that varies as a function of a current speed-related parameter of the wind turbine, such as the current speed setpoint for the wind turbine or the current air density of the air surrounding the wind turbine. The calculated dynamic overspeed setting may then be transmitted to an independent overspeed control device of the wind turbine. The overspeed control device also includes a fixed overspeed setting stored therein that is determined as a function of the nominal speed for the wind turbine. Upon receipt of the dynamic overspeed setting, the overspeed control device may determine the overspeed setting to be applied for the wind turbine by selecting the minimum overspeed setting between the dynamic overspeed setting and the fixed overspeed setting. Given that the dynamic overspeed setting is determined as a function of a current speed-related parameter for the wind turbine as opposed to its fixed nominal speed, the dynamic overspeed setting may be less than the fixed overspeed setting when the wind turbine is operating at reduced rotor speeds. As such, the overspeed control device may utilize the reduced, dynamic overspeed setting to monitor the rotor speed in a manner that can prevent the occurrence of extreme loading conditions in the event of a controller failure for a speed-derated wind turbine.

Referring now to the drawings, FIG. 1 illustrates a perspective view of one embodiment of a wind turbine 10 in accordance with aspects of the present subject matter. As shown, the wind turbine 10 generally includes a tower 12 extending from a support surface 14, a nacelle 16 mounted on the tower 12, and a rotor 18 coupled to the nacelle 16. The rotor 18 includes a rotatable hub 20 and at least one rotor blade 22 coupled to and extending outwardly from the hub 20. For example, in the illustrated embodiment, the rotor 18 includes three rotor blades 22. However, in an alternative embodiment, the rotor 18 may include more or less than three rotor blades 22. Each rotor blade 22 may be spaced about the hub 20 to facilitate rotating the rotor 18 to enable kinetic energy to be transferred from the wind into usable mechanical energy, and subsequently, electrical energy. For instance, the hub 20 may be rotatably coupled to an electric generator 24 (FIG. 2) positioned within the nacelle 16 to permit electrical energy to be produced.

The wind turbine 10 may also include a turbine control system or turbine controller 26 centralized within the nacelle 16 (or disposed at any other suitable location within and/or relative to the wind turbine 10). In general, the turbine controller 26 may comprise a computing device or any other suitable processor-based device. Thus, in several embodiments, the turbine controller 26 may include suitable computer-readable instructions that, when implemented, configure the controller 26 to perform various different functions, such as receiving, transmitting and/or executing wind turbine control signals. As such, the turbine controller 26 may generally be configured to control the various operating modes (e.g., start-up or shut-down sequences) and/or components of the wind turbine 10. For example, the controller 26 may be configured to adjust the blade pitch or pitch angle of each rotor blade 22 (i.e., an angle that determines a perspective of the blade 22 with respect to the direction of the wind) about its pitch axis 28 in order to control the rotational speed of the rotor blade 22 and/or the power output generated by the wind turbine 10. For instance, the turbine controller 26 may control the pitch angle of the rotor blades 22, either individually or simultaneously, by transmitting suitable control signals to one or more pitch drives or pitch adjustment mechanisms 32 (FIG. 2) of the wind turbine 10. Similarly, the turbine controller 26 may be configured to adjust the yaw angle of the nacelle 16 (i.e., an angle that determines a perspective of the nacelle 16 relative to the direction of the wind) about a yaw axis (not shown) of the wind turbine 10. For example, the controller 26 may transmit suitable control signals to one or more yaw drive mechanisms 46 (FIG. 2) of the wind turbine 10 to automatically control the yaw angle.

Referring now to FIG. 2, a simplified, internal view of one embodiment of the nacelle 16 of the wind turbine 10 shown in FIG. 1 is illustrated in accordance with aspects of the present subject matter. As shown, a generator 24 may be disposed within the nacelle 16. In general, the generator 24 may be coupled to the rotor 18 for producing electrical power from the rotational energy generated by the rotor 18. For example, as shown in the illustrated embodiment, the rotor 18 may include a rotor shaft 38 coupled to the hub 20 for rotation therewith. The rotor shaft 38 may, in turn, be rotatably coupled to a generator shaft 40 of the generator 24 through a gearbox 42. As is generally understood, the rotor shaft 38 may provide a low speed, high torque input to the gearbox 42 in response to rotation of the rotor blades 22 and the hub 20. The gearbox 42 may then be configured to convert the low speed, high torque input to a high speed, low torque output to drive the generator shaft 40 and, thus, the generator 24.

Additionally, as indicated above, the controller 26 may also be located within the nacelle 16 (e.g., within a control box or panel). However, in other embodiments, the controller 26 may be located within any other component of the wind turbine 10 or at a location outside the wind turbine 10. As is generally understood, the controller 26 may be communicatively coupled to any number of the components of the wind turbine 10 in order to control the operation of such components. For example, as indicated above, the controller 26 may be communicatively coupled to each pitch adjustment mechanism 32 of the wind turbine 10 (one for each rotor blade 22) via a pitch controller 30 to facilitate rotation of each rotor blade 22 about its pitch axis 28. Similarly, the controller 26 may be communicatively coupled to one or more yaw drive mechanisms 46 of the wind turbine 10 for adjusting the yaw angle or position of the nacelle 16. For instance, the yaw drive mechanism(s) 46 may be configured to adjust the yaw position by rotationally engaging a suitable yaw bearing 48 (also referred to as a slewring or tower ring gear) of the wind turbine 10, thereby allowing the nacelle 16 to be rotated about its yaw axis.

It should be appreciated that the turbine controller 26 may, in several embodiments, correspond to a processor-based device, such as a computing device or any combination of computing devices. For example, the turbine controller 26 may generally include one or more processor(s) and associated memory configured to perform a variety of computer-implemented functions (e.g., performing the methods, steps, calculations and the like disclosed herein). As used herein, the term "processor" refers not only to integrated circuits referred to in the art as being included in a computer, but also refers to a controller, a microcontroller, a microcomputer, a programmable logic controller (PLC), an application specific integrated circuit, and other programmable circuits. Additionally, the memory device(s) may generally comprise memory element(s) including, but not limited to, computer readable medium (e.g., random access memory (RAM)), computer readable non-volatile medium (e.g., a flash memory), a floppy disk, a compact disc-read only memory (CD-ROM), a magneto-optical disk (MOD), a digital versatile disc (DVD) and/or other suitable memory elements. Such memory may generally be configured to store information accessible to the processor(s), including data that can be retrieved, manipulated, created and/or stored by the processor(s) and instructions that can be executed by the processor(s). For instance, the memory device(s) may be configured to store suitable computer-readable instructions that, when implemented by the processor(s), configure the turbine controller 26 to perform various computer-implemented functions including, but not limited to, any of the control functions described herein. It should also be appreciated that the turbine controller 26 may include any suitable hardware that allows the controller 26 to function as described herein. For instance, the instructions or logic for the controller 26 may, in one embodiment, be implemented by hard-wired logic or other circuitry.

In addition, the wind turbine 10 may also include one or more sensors for monitoring various operating parameters of the wind turbine 10. For example, in several embodiments, the wind turbine 10 may include one or more speed sensors 50 configured to monitor one or more speed-related operating parameters of the wind turbine 10, such as the current rotor speed of the wind turbine 10, the current generator speed of the wind turbine 10 and/or the current air density of the air surrounding the wind turbine 10. Of course, the wind turbine 10 may further include various other suitable sensors for monitoring any other suitable operating conditions of the wind turbine 10.

It should be appreciated that the various sensors described herein may correspond to pre-existing sensors of a wind turbine 10 and/or sensors that have been specifically installed within the wind turbine 10 to allow one or more operating parameters to be monitored. It should also be appreciated that, as used herein, the term "monitor" and variations thereof indicates that the various sensors of the wind turbine 10 may be configured to provide a direct measurement of the operating parameters being monitored or an indirect measurement of such operating parameters. Thus, the sensors may, for example, be used to generate signals relating to the operating parameter being monitored, which can then be utilized by the controller 26 to determine the actual operating parameters.

As shown in FIG. 2, the wind turbine may also include an independent overspeed control device 60 configured to monitor the rotor speed of the wind turbine 10 so as to determine when the rotor speed reaches or exceeds a given overspeed setting(s) (e.g., a maximum speed limit) for the wind turbine 10. In several embodiments, the overspeed control device may correspond to a separate device from the turbine controller 26 (e.g., as shown in FIG. 2). Thus, the overspeed control device 60 may monitor the rotor speed independently from the turbine controller 26, which may allow the overspeed control device 60 to implement or initiate a corrective or control action to adjust the operation of the wind turbine when an overspeed condition is detected for the wind turbine 10 regardless of whether the turbine controller 26 is functioning properly. Accordingly, the overspeed control device 60 may serve as an independent means for ensuring that the rotor speed of the wind turbine 10 does not exceed the desired speed limit or setting.

Similar to the turbine controller 26, the overspeed control device 60 may, in several embodiments, correspond to a processor-based device, such as a computing device or any combination of computing devices. In such embodiments, the overspeed control device 60 may include one or more processor(s) and associated memory configured to perform a variety of computer-implemented functions (e.g., performing the methods, steps, calculations and the like disclosed herein). For instance, the memory device(s) may be configured to store suitable computer-readable instructions that, when implemented by the processor(s), configure the overspeed control device 60 to perform various computer-implemented functions including, but not limited to, any of the control functions described herein. It should be appreciated that the overspeed control device 60 may also include any suitable hardware that allows the overspeed control device 60 to function as described herein. For instance, the instructions or logic for the overspeed control device 60 may, in one embodiment, be implemented by hard-wired logic or other circuitry.

As will be described below with reference to FIG. 3, the overspeed control device 60 may, in several embodiments, be configured to receive a dynamic overspeed setting for the wind turbine 10 from the turbine controller 26. Thus it should be appreciated that the overspeed control device 60 may be configured to be communicatively coupled to the turbine controller 26 via any suitable communicative link. For instance, in one embodiment, a wired connection may be provided between the overspeed control device 60 and the turbine controller 26. In another embodiment, the overspeed control device 60 and the turbine controller 26 may be configured to communicate via a wireless connection using any suitable wireless communications protocol.

Additionally, it should be appreciated that, for purposes of illustration, the overspeed control device 60 is shown in FIG. 2 as being located within the same control box or panel as the turbine controller 26. However, in other embodiments, the overspeed control device 60 may be located at any other suitable location relative to the turbine controller 26, such as at any other location on and/or within the nacelle 16, any other location on and/or within another component of the wind turbine 10 and/or at a location external to the wind turbine 10.

Referring now to FIG. 3, schematic diagram of one embodiment of an overspeed monitoring system 100 for a wind turbine is illustrated in accordance with aspects of the present subject matter. As shown, both the turbine controller 26 and the overspeed control device 60 may be configured to receive speed signals (e.g., as indicated by arrows 102) from one or more components of the wind turbine 10 (e.g., from the one or more speed sensor(s) 50) that are associated with the current or actual rotor speed of the wind turbine 10. As indicated above, in several embodiments, it may be desired or necessary to operate a wind turbine at reduced or derated rotor speeds, such as at a speed setpoint that is less than then nominal speed setpoint for the wind turbine 10. In such embodiments, the speed setpoint for the wind turbine 10 may be set at a speed value that is less than the nominal speed setpoint, such as a value that is less than 5% of the nominal rotor speed setpoint or less than 10% of the nominal rotor speed setpoint or less than 20% less of the nominal rotor speed setpoint or less than 30% less than the nominal rotor speed setpoint.

As shown in FIG. 3, the turbine controller 26 may, in one embodiment, be configured to implement an internal or first overspeed monitor 104 that monitors the current rotor speed of the wind turbine 10 (e.g., via speed signal 102) relative to a first predetermined overspeed setting 106 for the wind turbine 10. For instance, the first predetermined overspeed setting 106 may correspond to a fixed maximum speed limit that is determined based on the nominal speed setting for the wind turbine 10 (e.g., by setting the first predetermined overspeed setting 106 at a value that exceeds the nominal speed setting for the wind turbine 10 by a predetermined amount). When implementing the first overspeed monitor 104, the turbine controller 26 may be configured to compare the current rotor speed of the wind turbine 10 to the first predetermined overspeed setting 106 to determine whether the rotor speed is equal to or exceeds such overspeed setting. In the event that the rotor speed is equal to or exceeds the first predetermined overspeed setting 106, the turbine controller 26 may be configured to initiate a corrective action to adjust the operation of the wind turbine 10 in a manner that reduces the rotor speed to a level below the first predetermined overspeed setting 106. For instance, in one embodiment, the turbine controller 26 may be configured to implement a controller-based shutdown sequence of the wind turbine 10 to initiate a controlled shutdown of the turbine 10. Alternatively, the turbine controller 26 may be configured to initiate any other suitable corrective action that results in a reduction of the rotor speed, such as by pitching the rotor blades 22, yawing the nacelle 16, adjusting the torque demand on the generator 24 and/or activating a brake of the wind turbine 10.

Additionally, the turbine controller 26 may also be configured to implement a calculator (e.g., as indicated by box 108) that is configured to calculate a dynamic overspeed setting for the wind turbine 10 (e.g., indicated by arrow 110) and transmit such overspeed setting 110 to the overspeed control device 60 (e.g., via the communicative link provided between the controller 26 and the overspeed control device 60). In several embodiments, the controller 26 may be configured to calculate the dynamic overspeed setting 110 based on the current speed setpoint for the wind turbine 10 such that the dynamic overspeed setting 110 varies as a function of the current speed setpoint. For example, when the wind turbine 10 is being operated within a reduced speed mode, the current speed setpoint for the wind turbine 10 may be set at a desired rotor speed that is less than the nominal speed setpoint for the wind turbine 10. In such instance, the turbine controller 26 may utilize the reduced speed setpoint to calculate the dynamic overspeed setting 110. For example, in one embodiment, the dynamic overspeed setting 110 may be calculated using the following equation (Equation 1):

$$DOS = CSS * OF \quad (1)$$

wherein, DOS corresponds to the dynamic overspeed setting 110 for the wind turbine 10, CSS corresponds to the current speed setpoint for the wind turbine 10, and OF corresponds to an overspeed factor used by the turbine controller 26 to set the dynamic overspeed setting 110 as a function of the current speed setpoint.

It should be appreciated that, in general, the overspeed factor may correspond to any suitable value or table of value(s) that may be used to provide the desired relationship between the current speed setpoint and the dynamic overspeed setting 110. For instance, in one embodiment, the overspeed factor may be selected as a value between 1.10 and 1.40 so that the dynamic overspeed setting 110 corresponds to a speed limit or setting that ranges from about 10% to about 40% higher than the current speed setpoint, such as by selecting the overspeed factor to be a value between 1.20 and 1.30 so that the dynamic overspeed setting 110 corresponds to a speed limit or setting that ranges from about 20% to about 30% higher than the current speed setpoint. It should also be appreciated that, in one embodiment, the overspeed factor used to calculate the dynamic overspeed setting may remain constant across all speed setpoints for the wind turbine. Alternatively, the overspeed factor may be varied based across one or more of the speed setpoints for the wind turbine.

It should be appreciated that, in other embodiments, the dynamic overspeed setting may be determined based on any other suitable speed-related parameter for the wind turbine. For instance, in one embodiment, the dynamic overspeed setting may be determined as a function of the current air density of the air surrounding the wind turbine. Specifically, as indicated above, a wind turbine may often be operated at a given speed setpoint based on the current air density, such as when a wind turbine is operated at a reduce speed to compensate for the higher loads caused by higher air densities. In such instances, the dynamic overspeed setting may be varied as a function of the air density, such as by correlating various air density values to corresponding dynamic overspeed settings using a look-up table or any other suitable means.

As shown in FIG. 3, similar to the turbine controller 26, the overspeed control device 60 of the disclosed system 100 may also be configured to implement an overspeed monitor 120 that monitors the current rotor speed of the wind turbine 10 (e.g., via speed signal 102) relative to a given overspeed setting. In doing so, the overspeed control device 60 may be configured to receive the dynamic overspeed setting 110 from the turbine controller 26 and, based on such overspeed setting 110, determine a final overspeed setting (e.g., as indicated by arrow 122) to be applied for the wind turbine 10 (e.g., as indicated at box 124). Specifically, as shown in FIG. 3, the overspeed control device 60 may, in one embodiment, be configured to compare the dynamic overspeed setting 110 to a second predetermined overspeed setting (e.g., indicated by box 126) stored within the overspeed control device 60 to a determine the lowest or minimum speed value between the two settings. In such an embodiment, the minimum overspeed setting between the dynamic overspeed setting 110 and the second predetermined overspeed setting 126 may then be set as the final overspeed setting 122 to be applied within the overspeed monitor 120.

When implementing the overspeed monitor 120, the overspeed control device 60 may be configured to compare the final overspeed setting 122 with the current rotor speed to determine whether the rotor speed is equal to or exceeds the overspeed setting 122. In the event that the rotor speed is equal to or exceeds the final overspeed setting 122, the overspeed control device 60 may be configured to initiate a corrective or control action to adjust the operation of the wind turbine 10 in a manner that reduces the rotor speed to a level below the applicable overspeed setting 122. For instance, as shown in FIG. 4, the overspeed control device 60 may, in one embodiment, be configured to activate a safety chain (e.g., at box 130) that, in turn, initiates a non-controller-based shutdown sequence so as to implement an immediate shutdown of the turbine 10. Specifically, when the safety chain is activated, the turbine controller 26 may be decoupled from the other wind turbine components or otherwise rendered incapable of performing its conventional control functions such that the wind turbine 10 may be shutdown independent of the turbine controller 26. Alternatively, the overspeed control device 60 may be configured to initiate any other suitable corrective action that results in a reduction of the rotor speed, such as by simply pitching the rotor blades 22, yawing the nacelle 16, adjusting the torque demand on the generator 24 and/or activating a brake of the wind turbine 10.

It should be appreciated that the second predetermined overspeed setting 126 may generally correspond to a_fixed maximum speed limit that is determined based on the nominal speed setting for the wind turbine 10 (e.g., by setting the second predetermined overspeed setting 126 at a value that exceeds the nominal speed setting for the wind turbine 10 by a predetermined amount). For instance, in one embodiment, the second predetermined overspeed setting 126 may correspond to the nominal speed setpoint for the wind turbine 10 multiplied by a given overspeed factor (e.g., a value ranging from 1.1 to 1.4). It should also be appreciated that the second predetermined overspeed setting 126 may, in several embodiments, differ from the first predetermined overspeed setting 106. For instance, in one embodiment, the first predetermined overspeed setting 106 used by the turbine controller 26 may be equal to a speed limit or value that is less than the speed limit or value corresponding to the second predetermined overspeed setting 126.

By calculating the dynamic overspeed setting 110 based on a current speed-related parameter of the wind turbine, such as the current speed setpoint for the wind turbine 10 or the current air density, the disclosed system 100 may adjust the overspeed control settings applied by the overspeed control device 60 in order to accommodate instances in which the wind turbine 10 is being operated at reduced speeds. For instance, by scaling down the dynamic overspeed setting 110 as the speed setpoint for the wind turbine 10 is reduced, the dynamic overspeed setting 110 may be equal to a speed limit or value that is less than the speed limit or value corresponding to the second predetermined overspeed setting 126 when the wind turbine 10 is operating at a speed setpoint that is less than its nominal speed setpoint. In such instance, the final overspeed setting 122 applied by the overspeed control device 60 may correspond to the dynamic overspeed setting 110, thereby allowing the control device 60 to adapt its control functionality to the reduced rotor speeds. Accordingly, in a situation in which the turbine controller 26 fails while the wind turbine 10 is operating in a reduced speed mode, the overspeed control device 60 may be allowed to activate the safety chain 130 to implement an immediate shutdown of the wind turbine 10 prior to the rotor speed reaching and/or exceeding the higher, second predetermined overspeed setting 126, thereby preventing an extreme loading condition on the wind turbine 10.

Referring now to FIG. 4, a variation of the embodiment of the overspeed monitoring system 100 described above with reference to FIG. 3 is illustrated in accordance with aspects of the present subject matter. In general, the overspeed monitoring system 100 shown in FIG. 4 is configured the same as the system 100 described above. However, in addition to the overspeed control device 60 being configured to adjust its final overspeed setting 122 based on the dynamic overspeed setting 110 received from the turbine controller 26, the overspeed control device 60 may also be configured to perform a "watch dog" function for the turbine controller 26. Specifically, as shown in FIG. 4, the overspeed control device 60 may be configured to continuously monitor the health or operational status of the turbine controller 26 (e.g., as indicated at box 140) based on "life sign" signals received from the controller 26 (e.g., indicated by arrow 142). For example, the turbine controller 26 may be configured to periodically transmit a "life sign" signal 142 to the overspeed control device 60 (e.g., every 100 microseconds) that provides an indication of whether the turbine controller 26 is operating properly. For instance, the controller 26 may be configured to transmit a "life sign" signal 142 at a given frequency that toggles between a value of zero and a value of one. In the event that the overspeed control device 60 does not receive the "life sign" signal 142 at the required frequency and/or if the signal 142 is not properly toggled between the appropriate values, the overspeed control device 60 may determine that the turbine controller 26 is not functioning properly. Thereafter, the overspeed control device 26 may be configured to activate the safety chain 130 to initiate an immediate shutdown of the wind turbine 10.

It should be appreciated that, although the turbine controller 26 and the overspeed control device 60 of the disclosed system 100 are described above with reference to FIGS. 3 and 4 as performing specific control functions, each individual control device 26, 60 may be configured to perform any of the functions described above. For instance, in an alternative embodiment, the overspeed control device 60 may be configured to calculate the dynamic overspeed setting 110 based on a current speed-related parameter for the wind turbine such as the current speed setpoint or the current air density. Similarly, in another alternative embodiment, the turbine controller 26 may be configured to implement all of the functions of the overspeed control device 60.

Referring now to FIG. 5, a flow diagram of one embodiment of a method for overspeed monitoring of a wind turbine is illustrated in accordance with aspects of the present subject matter. In general, the method 200 will be described herein with reference to the system 100 described above with reference to FIGS. 3 and 4. However, it should be appreciated by those of ordinary skill in the art that the disclosed method 200 may be implemented within any other system. In addition, although FIG. 5 depicts steps performed in a particular order for purposes of illustration and discussion, the methods discussed herein are not limited to any particular order or arrangement. One skilled in the art, using the disclosures provided herein, will appreciate that various steps of the methods disclosed herein can be omitted, rearranged, combined, and/or adapted in various ways without deviating from the scope of the present disclosure.

As shown in FIG. 5, at (202), the method 200 may include monitoring an actual rotor speed of the wind turbine while the wind turbine is operating at a current speed setpoint. For instance, as indicated above, the overspeed control device 60 may be configured to monitor the rotor speed of the wind turbine based on rotor speed signals 102 received from one or more components of the wind turbine 10 (e.g., the speed sensor(s) 50).

Additionally, at (204), the method 200 may include referencing a dynamic overspeed setting for the wind turbine. Specifically, as indicated above, the turbine controller 26 may, in one embodiment, be configured to calculate a dynamic overspeed setting 110 based on a current speed-related parameter of the wind turbine 10 (e.g., the current speed setpoint or the current air density) and transmit the overspeed setting 110 to the overspeed control device 60. In such an embodiment, the overspeed control device 60 may be configured to reference the dynamic overspeed setting 110 received from the turbine controller 26 to determine the final overspeed setting (e.g., as indicated below).

Moreover, at (206), the method 200 may include determining a final overspeed setting to be applied for the wind turbine based on a comparison between the dynamic overspeed setting and a predetermined overspeed setting for the wind turbine. For example, in several embodiments, the overspeed control device may be configured to select the final overspeed setting as the minimum value between the dynamic overspeed setting and the predetermined overspeed setting.

Referring still to FIG. 5, at (208), the method 200 may include comparing the actual rotor speed of the wind turbine to the final overspeed setting. Additionally, at (210), the method 200 may include initiating a control action to adjust an operation of the wind turbine in a manner that reduces the actual rotor speed when the actual rotor speed is equal to or exceeds the final overspeed setting. For example, as described above, the overspeed control device 60 may be configured to activate a safety chain 130 to initiate a shutdown sequence of the wind turbine when it is determined that the actual rotor speed is equal to or exceeds the final overspeed setting applied by the overspeed control device 60.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A method for overspeed monitoring of a wind turbine, the method comprising:
    monitoring, with a control device, an actual rotor speed of the wind turbine while the wind turbine is operating at a current speed setpoint;
    referencing, with the control device, a dynamic overspeed setting for the wind turbine;
    determining, with the control device, a final overspeed setting to be applied for the wind turbine based on a comparison between the dynamic overspeed setting and a predetermined overspeed setting for the wind turbine;
    comparing, with the control device, the actual rotor speed of the wind turbine to the final overspeed setting; and
    when the actual rotor speed is equal to or exceeds the final overspeed setting, initiating, with the control device, a control action to adjust an operation of the wind turbine in a manner that reduces the actual rotor speed.

2. The method of claim 1, wherein the current speed setpoint corresponds to a speed setpoint that is less than a nominal speed setpoint for the wind turbine.

3. The method of claim 2, wherein the dynamic overspeed setting varies as a function of the current speed setpoint such that the dynamic overspeed setting is less than the predetermined overspeed setting when the current speed setpoint is less than the nominal speed setpoint for the wind turbine.

4. The method of claim 1, wherein referencing the dynamic overspeed setting comprises receiving the dynamic overspeed setting from a turbine controller of the wind turbine, the turbine controller corresponding to a separate device from the control device.

5. The method of claim 1, wherein the dynamic overspeed setting is determined as a function of at least one of the current speed setpoint and an overspeed factor.

6. The method of claim 5, wherein the overspeed factor is selected such that the dynamic overspeed setting corresponds to a speed setting that is 10% to 40% higher than the current speed setpoint.

7. The method of claim 1, wherein determining the final speed setting for the wind turbine comprises selecting the final speed setting as a minimum of the dynamic overspeed setting and the predetermined overspeed setting.

8. The method of claim 1, wherein the predetermined overspeed setting corresponds to a fixed speed limit for the wind turbine determined based on a nominal speed setpoint of the wind turbine.

9. The method of claim 1, wherein initiating the control action to adjust the operation of the wind turbine comprises initiating a shutdown sequence for the wind turbine.

10. The method of claim 1, wherein initiating the control action to adjust the operation of the wind turbine comprises activating a safety chain to decouple a turbine controller of the wind turbine from other components of the wind turbine.

11. The method of claim 1, further comprising monitoring, with the control device, an operational status of a turbine controller of the wind turbine, the turbine controller correspond to a separate device from the control device.

12. An overspeed monitoring system for a wind turbine, the system comprising:
    a turbine controller configured to control one or more components of the wind turbine so that the wind turbine operates at a current speed setpoint, the turbine controller being further configured to determine a dynamic overspeed setting for the wind turbine; and
    an overspeed control device communicatively coupled to the turbine controller, the overspeed control device being configured to receive the dynamic overspeed setting from the turbine controller and determine a final overspeed setting to be applied for the wind turbine based on a comparison between the dynamic overspeed setting and a predetermined overspeed setting for the wind turbine, the overspeed control device being further configured to monitor an actual rotor speed of the wind turbine and compare the actual rotor speed to the final overspeed setting, wherein, when the actual rotor speed is equal to or exceeds the final overspeed setting, the control device is configured to initiate a control action to adjust the operation of the wind turbine in a manner that reduces the actual rotor speed.

13. The system of claim 12, wherein the current speed setpoint corresponds to a speed setpoint that is less than a nominal speed setpoint for the wind turbine.

14. The system of claim 13, wherein the dynamic overspeed setting varies as a function of the current speed setpoint such that the dynamic overspeed setting is less than the predetermined overspeed setting when the current speed setpoint is less than the nominal speed setpoint for the wind turbine.

15. The system of claim 12, wherein the overspeed control device correspond to a separate device from the turbine controller.

16. The system of claim 12, wherein the dynamic overspeed setting is determined by the turbine controller as a function of both the current speed setpoint and an overspeed factor.

17. The system of claim 16, wherein the overspeed factor is selected such that the dynamic overspeed setting corresponds to a speed setting that is 10% to 40% higher than the current speed setpoint.

18. The system of claim 12, wherein the overspeed control device is configured to select the final speed setting as a minimum of the dynamic overspeed setting and the predetermined overspeed setting.

19. The system of claim 12, wherein the predetermined overspeed setting corresponds to a fixed speed limit for the wind turbine determined based on a nominal speed setpoint of the wind turbine.

20. The system of claim 12, wherein the control action correspond to the initiation of a shutdown sequence for the wind turbine.

* * * * *